Patented May 30, 1944

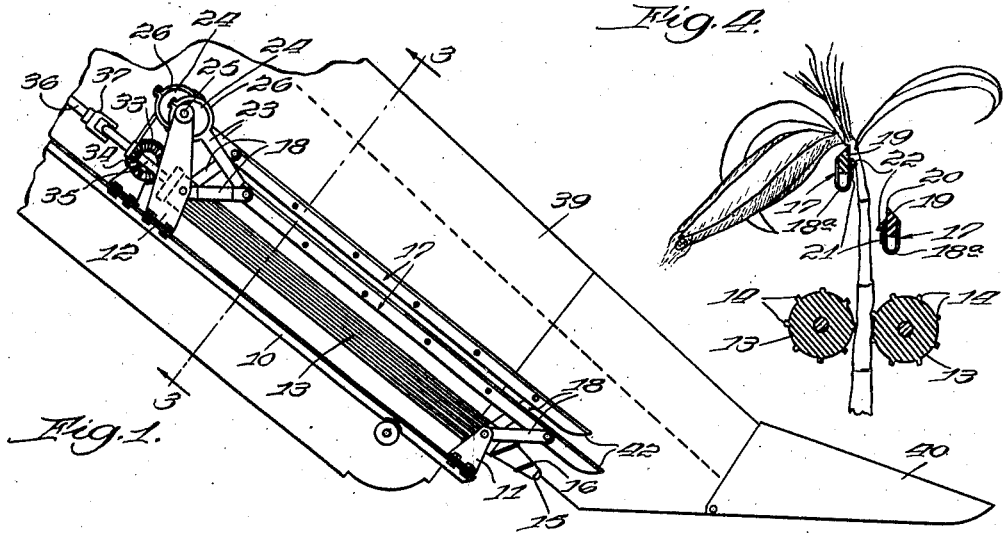
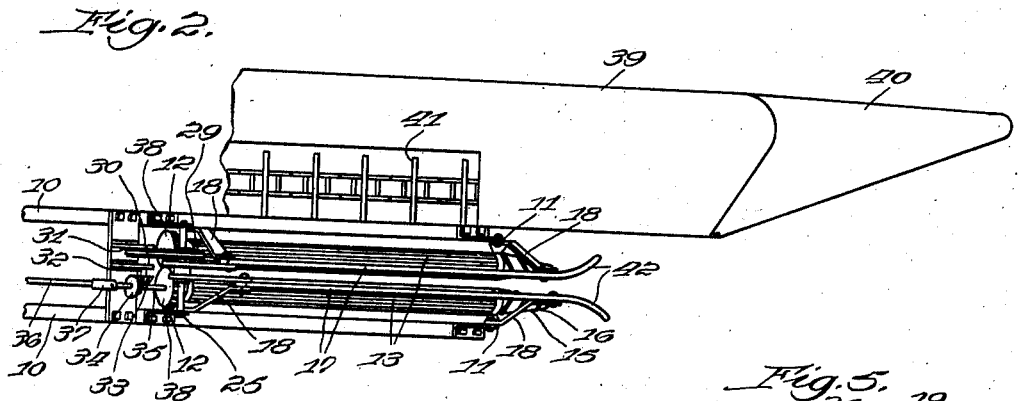
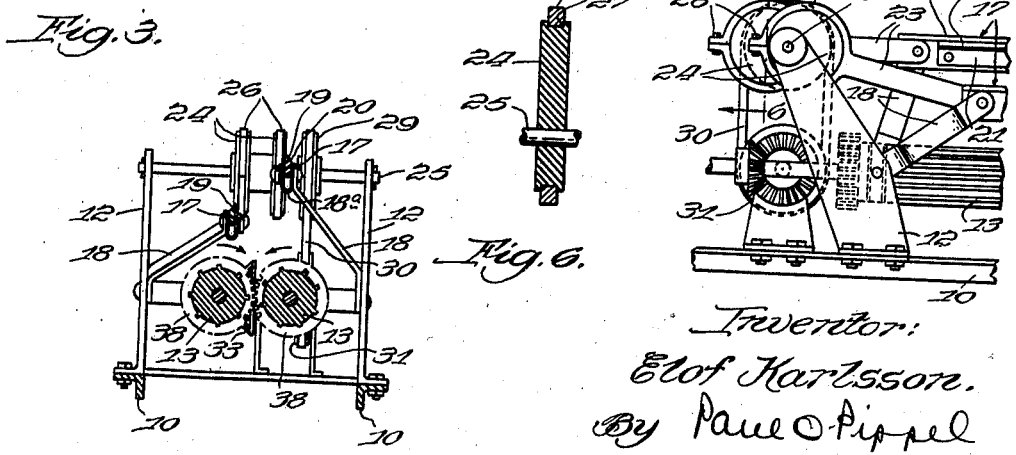

2,349,869

UNITED STATES PATENT OFFICE 2,349,869

CORN HARVESTER

Elof Karlsson, Moline, Ill., assignor to International Harvester Company, a corporation of New Jersey Application August 28, 1941, Serial No. 408,650

17 Claims. (Cl. 56—107)

This invention relates to a corn harvester. More specifically, it relates to a device for removing ears from corn stalks.

The usual device for removing ears from corn stalks includes snapping rolls. The greatest danger with the use of snapping rolls is that the ears of corn may become damaged, and shelling may occur, because the ears themselves are caught between the snapping rolls and crushed. With the increased use of hybrid corn, shelling may be a considerable factor and it is necessary to handle the ears as gently as possible.

An object of the present invention is to provide an improved harvester.

A further object is the provision of an improved device for removing ears from corn stalks.

Another object is to provide a construction which will avoid the snapping of ears from corn stalks by means of rolls and will thereby reduce shelling.

According to the present invention, a pair of strippers is mounted above a pair of rolls for oscillation toward and away from the rolls. The rolls serve to grip stalks between them, and the oscillating strippers knock ears from the stalk.

In the drawing—

Figure 1 is a side view, with parts removed, showing the novel device of the present invention for picking ears of corn;

Figure 2 is a plan view of the parts shown in Figure 1;

Figure 3 is a sectional view taken along the line 3—3 of Figure 1;

Figure 4 is a sectional view somewhat similar to that of Figure 3 but showing only rolls and strippers acting upon a corn stalk;

Figure 5 is a view showing certain parts of Figure 1 in detail; and

Figure 6 is a sectional view taken along the line 6—6 of Figure 5.

Figures 1 and 2 show a supporting means formed of a pair of angle members 10. In the angle members there are lower brackets 11 and upper brackets 12 which rotatably support the lower and upper ends of rolls 13. Each roll is provided with a series of peripherally spaced, longitudinally extending ribs 14 and a lower end 15 of conical shape provided with a spiral 16. Positioned above the rolls is a pair of strippers 17. The strippers are connected to parallel links 18 which are in turn connected to brackets 11 and 12. Each stripper 17 is composed of a metallic U-shaped channel member 18a and a nonmetallic insert 19 which may be formed of rubber. Each insert extends upwardly beyond the channel member 18a to which it is attached and has an upper surface sloping and intersecting one side surface at an acute angle, so that the insert has a rather sharp upper edge 20. Secured, as by soldering, bolting, or welding, to the side of each channel member 18a toward the other channel member 18a is a metallic element 21. Each element 21 has a flange 22 extending downwardly and outwardly in a direction toward the other stripper. The strippers 17 are adapted to move toward and away from the rolls 13 by virtue of their connection with the links 18. The one stripper is to be moved down as the other stripper moves up. The upper end of the strippers is connected by connecting elements 23 to circular eccentric members 24 secured to a drive shaft 25. Each connecting member 23 has an enlarged circular portion 26 which is slipped over a circular eccentric member 24 and into a peripheral groove 27 in the member 24. The circular portions 26 are retained in the grooves 27 by bolts 28. Mounted upon the drive shaft 25 is a pulley 29 engaged by a belt 30, which in turn engages a pulley 31 secured to a shaft 32. Also secured to the shaft 32 is a bevel gear 33 which is in mesh with a bevel gear 34 secured to a shaft 35 formed as an extension of one roll 13. The shaft 35 is connected with a shaft 36 by means of a universal joint 37.

As previously stated, one stripper 17 moves up as the other moves down, and this is accomplished by the securement of circular eccentrics 24 to the shaft 25 in such a manner that they are offset to opposite sides of the shaft, as shown in Figure 5. Drive of rolls 13 originates with the shaft 36 which transmits drive through the universal joint 37 to the shaft 35 and in turn to the roll 13 from which the shaft 35 extends. Drive is transmitted from the said one roll 13 to the other roll 13 through spur gear sections 38 formed on the rolls 13. Drive is transmitted from the shaft 35 through the bevel gears 33 and 34 and through the belt 30 to the shaft 25. The shaft 25 rotates the eccentrics 24, and oscillative movement is supplied to the connecting members 23 through the enlarged circular portions 26 rotatively embracing the eccentric members 24. The connecting members 23 transmit an oscillation to the strippers 17 which has a component of movement toward and away from the rolls 13 and also a component of movement in the direction of the length of the rolls.

Secured alongside the rolls and strippers is a shield 39 which has at its lower end a gather point 40. Mounted within the shield 39 is an ear forwarder 41, which may extend upwardly to husking rolls, not shown. The lower ends of the strippers 17 extend somewhat forwardly of the rolls 13 and are curved outwardly, as indicated at 42, so as to form a converging throat for the reception of corn stalks. Another shield member and divider point, similar to the shield member 39 and divider point 40, will be positioned on the opposite sides of the rolls and snappers, but these are not shown since they form no part of the present invention.

In operation, the corn picker of which the rolls 13 and strippers 17 form parts is moved through a field of standing stalks of corn. The stalks pass between the strippers 17 and the rolls 13. The action of these parts upon the stalks is as shown in Figure 4. The rolls 13 rotate as indicated so as to have a downward pull upon the stalks and the oscillating stripper 17 knocks the ears from the stalks. The inserts 19, being of rubber or other non-metallic substance, are somewhat gentle in their action. The relatively sharp edges 20 have a slight cutting action in dislodging ears from stalks. In the event that a corn stalk breaks off above the rolls 13, the flange 22 of one element 21 on a stripper 17 digs into the stalk so as to give it downward movement similar to that produced by the rolls 13, and the other stripper 17 has an upward movement so as to knock ears from the stalk.

It will be seen from the arrangement just described that the attached ears of corn will be kept away from the rolls 13, since the strippers 17 will reach the portion of the stalks to which the ears are attached and will remove the ears before the rolls reach the same portion of the stalks. Thus, pinching of the ears by the rolls, with consequent shelling, is avoided. The rolls 13 have the advantage of snapping rolls in that they obtain a firm grip upon the stalks and rotate in the proper direction for pulling the stalks downwardly.

The rolls and strippers just described may form part of a picker which is mounted on a tractor or pulled behind the tractor, or pulled by any other means. They are illustrated for use in the removal of ears of corn from stalks, but it is obvious that they may be employed for the stripping of other types of crops from standing stalks.

The intention is to limit the invention only within the spirit of the appended claims.

What is claimed is:

1. In combination, supporting means, a pair of rolls, means rotatably mounting the rolls on the supporting means, means rotating the rolls to cause them to move downwardly at their adjacent portions, a pair of strippers positioned above the snapping rolls, and means mounting the strippers on the supporting means for oscillating movement toward and away from the snapping rolls.

2. In combination, supporting means, a pair of rolls, means rotatably mounting the rolls on the supporting means, means rotating the rolls to cause them to move downwardly at their adjacent portions, a pair of strippers positioned above the rolls, and parallel links mounting the strippers on the supporting means for oscillating movement toward and away from the rolls.

3. A corn-picker construction comprising supporting means, a pair of strippers, and means mounting the strippers for vertical oscillating movement, each stripper comprising an upwardly opening U-shaped metal member and a non-metallic insert partially positioned within the U-shaped member and partially extending above the U-shaped member.

4. A corn-picker construction comprising supporting means, a pair of strippers, and means mounting the strippers for vertical oscillating movement, each stripper comprising an upwardly opening U-shaped metal member and a rubber insert partially positioned within the U-shaped member and partially extending thereabove, the top surface and one side surface of the insert meeting in an acute angle so as to provide the insert with a cutting edge.

5. A corn-picker construction comprising supporting means, a pair of strippers and parallel links mounting the strippers for oscillating vertical movement, each stripper comprising an upwardly opening U-shaped metal member and a nonmetallic insert partially positioned within the U-shaped member and partially extending above the U-shaped member.

6. A corn-picker construction comprising supporting means, a pair of strippers, and parallel links mounting the strippers for oscillating vertical movement, each stripper comprising an upwardly opening U-shaped member and a rubber insert partially positioned within the U-shaped member and partially extending thereabove, the top surface and one side surface of the insert meeting in an acute angle so as to provide the insert with a cutting edge.

7. In combination, supporting means, a pair of rolls, means mounting the rolls for rotation on the supporting means, means for rotating the rolls, a pair of stripper members positioned over the rolls, links connecting the strippers and the supporting means for movement toward and away from the rolls, and means for driving the strippers comprising a drive shaft extending transversely of the rolls, circular eccentric members secured to the shaft, and connecting elements having one element rotatively embracing the eccentric members and the other end connected to the strippers.

8. In combination, supporting means, strippers, and means mounting the strippers for vertical oscillating movement, one stripper being moved up as the other stripper is moved down, each stripper having on its side toward the other stripper means extending downwardly and toward the other stripper for digging into broken stalks.

9. In combination, supporting means, strippers, and means mounting the strippers for vertical oscillating movement, one stripper being moved up as the other stripper is moved down, each stripper having on its side toward the other stripper a sharp element extending downwardly and toward the other stripper for digging into broken corn stalks, whereby a broken stalk is restrained from upward movement by the sharp element on one stripper and the ears are removed by the other stripper.

10. The combination specified in claim 1 and further including means for causing one stripper to move toward the rolls as the other stripper moves away from them.

11. The combination specified in claim 2 and further including means for causing one stripper to move toward the rolls as the other stripper moves away from them.

12. The combination specified in claim 3 and further including means for causing one stripper to move toward the rolls as the other stripper moves away from them.

13. The combination specified in claim 4 and further including means for causing one stripper to move toward the rolls as the other stripper moves away from them.

14. The combination specified in claim 5 and further including means for causing one stripper to move toward the rolls as the other stripper moves away from them.

15. The combination specified in claim 6 and further including means for causing one stripper to move toward the rolls as the other stripper moves away from them.

16. In combination, supporting means, a pair of rolls, means rotatably mounting the rolls on the supporting means, means rotating the rolls to cause them to move downwardly at their adjacent portions, a pair of strippers positioned above the snapping rolls, and means mounting the strippers on the supporting means for oscillating movement toward and away from the snapping rolls, each stripper comprising an upwardly opening U-shaped metal member and a nonmetallic insert partially positioned within the U-shaped member and partially extending above the U-shaped member.

17. In combination, supporting means, a pair of rolls, means rotatably mounting the rolls on the supporting means, means rotating the rolls to cause them to move downwardly at their adjacent portions, a pair of strippers positioned above the snapping rolls, and means mounting the strippers on the supporting means for oscillating movement toward and away from the snapping rolls, each stripper comprising an upwardly opening U-shaped metal member and a rubber insert partially positioned within the U-shaped member and partially extending thereabove, the top surface and one side surface of the insert meeting in an acute angle so as to provide the insert with a cutting edge.

ELOF KARLSSON.